United States Patent

[11] 3,588,867

| [72] | Inventor | Richard A. Harris<br>High Point, N.C. |
|---|---|---|
| [21] | Appl. No. | 719,952 |
| [22] | Filed | Apr. 9, 1968 |
| [45] | Patented | June 28, 1971 |
| [73] | Assignee | Western Electric Company, Incorporated<br>New York, N.Y. |

[54] ROVING LIMIT INDICATOR
4 Claims, 3 Drawing Figs.

| [52] | U.S. Cl. ................................................. | 340/282,<br>340/267R |
|---|---|---|
| [51] | Int. Cl. ..................................................... G08b 21/00 | |
| [50] | Field of Search ........................................... | 340/282,<br>267; 33/1 (M) |

[56] References Cited
UNITED STATES PATENTS

| 3,135,055 | 6/1964 | Butler et al. .................. | 340/282X |
|---|---|---|---|
| 3,350,617 | 10/1967 | Firth............................. | 340/282X |

*Primary Examiner*—John W. Caldwell
*Assistant Examiner*—Michael Slobasky
*Attorneys*—R. P. Miller, W. M. Kain and W. L. Williamson ABSTRACT: A roving limit indicator for a worktable includes a sliding member having a V-shaped groove and which is moved by a V-shaped probe on the worktable engaging the V-shaped groove in the member. When the table reaches a selected position, the probe is raised within the groove such that the table may be moved by a limited length of movement without the probe contacting the sides of the groove. If the probe contacts the sides of the groove an electrical circuit is completed which indicates that the worktable has moved to a limit.

PATENTED JUN28 1971

3,588,867

INVENTOR
R. A. HARRIS

BY D. W. Marks
ATTORNEY

ROVING LIMIT INDICATOR

BACKGROUND OF THE INVENTION

1. Field of the Invention

This invention is concerned with limit indicators. In manufacturing operations, worktables and other apparatus are moved in one or more directions to position workpieces or to perform operations. It is sometimes desirable to provide such apparatus with limit switches to stop the movement of the apparatus if it exceeds predetermined limits.

2. Description of the Prior Art

Many limit indicators have been used in the prior art. Some limit indicators have electrical switches or contacts mounted on the apparatus which are engaged by the moving apparatus when the apparatus reaches the selected limits. Such limiting devices, however, are not adaptable to limit the movement of a fine positioning apparatus where a worktable is first coarsely positioned and the maximum limits of movement of the fine positioning apparatus are much less than the movement of the coarse positioning apparatus.

SUMMARY OF THE INVENTION

An object of the present invention is a limit indicator which is moved with an apparatus while it is coarsely positioned and which indicates the limits of movement of the apparatus when it is finely positioned.

In accordance with this and other objects, a limit indicator includes a sliding member which is moved in a direct relationship while a workpiece or a worktable is moved until the workpiece reaches a selected position. When the selected position has been reached, facilities sense the length of movement of the workpiece relative to the sliding member to indicate the movement of the workpiece.

DETAILED DESCRIPTION

Figure 1:
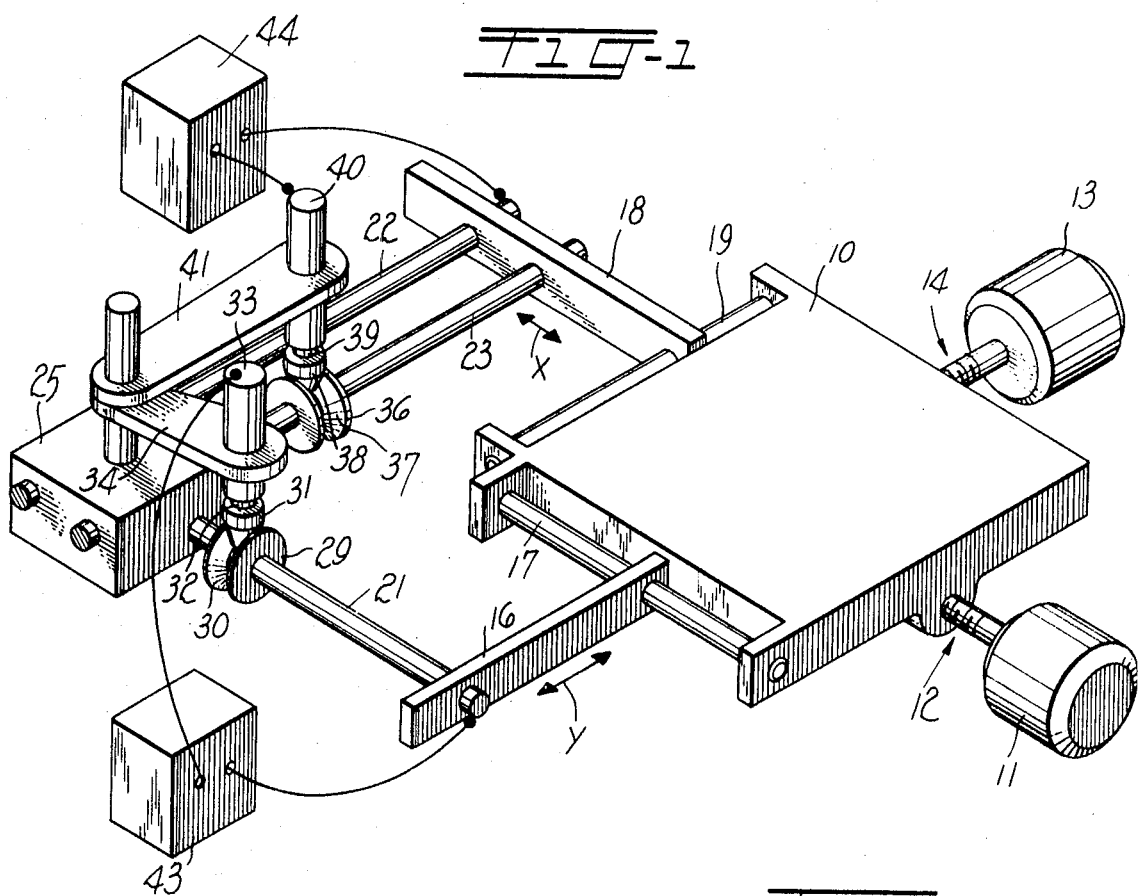
FIG. 1 is an isometric drawing showing a roving limit indicator mounted on a workpiece moving apparatus.

Referring first to FIG. 1, there is shown a worktable 10 which may be moved in two perpendicular directions, X and Y, as shown by the arrows. A reversible motor 11 operating a screw mechanism 12, attached to the table 10, is effective to move the table 10 backwards or forwards in the X direction. A motor 13 connected to a screw mechanism 14 is effective to move the table 10 backwards and forwards in the Y direction.

A bar 16 is slidably attached to a shaft 17 mounted on the side of the table 10 such that the bar 16 moves only in the Y direction to follow the Y movement of the table 10. Similarly, a bar 18 is slidably connected to a shaft 19 mounted on a side of the table 10 such that the bar 18 moves only in the X direction to follow the X movement of the table 10. A shaft 21 is rigidly attached to the bar 16 while shafts 22 and 23 are rigidly attached to the bar 18. A block 25 is slidably mounted on the shafts 21, 22 and 23 where the shaft 21 crosses the shafts 22 and 23. The block 25 follows both the X and Y movement of the table 10.

In operation, the table 10 is first coarsely positioned until a photocell (not shown) mounted on the block 25 indicates that a light through a hole in a pattern has been sensed. For example, the table 10 may first be moved in an X direction until the photocell senses a first hole in the pattern and then moved in a Y direction until the photocell senses a second hole in the pattern. Upon sensing the second hole in the pattern, the table 10 has been coarsely positioned. At this time, a fine positioning mechanism such as is described in F. H. Blitchington, Jr. application, Ser. No. 719,423, filed Apr. 9, 1968, and assigned to Western Electric Company, Inc., is used to finely position the worktable with respect to a tool. The fine positioning mechanism operates the motors 11 and 13. The course positioning mechanism may operate another table upon which the table 10 and the motors 13 and 11 are mounted. Alternately, the course positioning mechanism may operate the motors 11 and 13.

Mounted on the shaft 21 is a sleevelike sliding contact member 29 having a V-shaped groove 30 in its periphery. A cooperating V-shaped probe 31 is mounted on a piston rod 32 extending from an air cylinder 33. The air cylinder 33 is mounted by an insulative arm 34 on the block 25. Similarly, a sleevelike sliding contact member 36 is slidably mounted on the rod 23. The member 36 has a V-shaped groove 37. A V-shaped probe 38 mounted on a piston rod 39 extending from an air cylinder 40 cooperates with the V-shaped groove 37. The air cylinder 40 is mounted by an insulative arm 41 on the block 25. An indicating device 43 is electrically connected across the shaft 21 and the probe 31. Similarly, an indicating device 44 is electrically connected across the probe 38 and the shaft 23.

Figure 2:
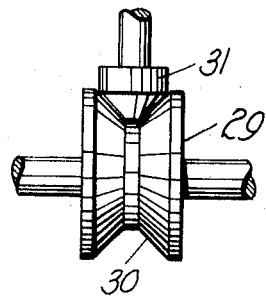
FIGS. 2 and 3 are elevation views showing relative positions of a probe with respect to a sliding member of the roving limit indicator during course positioning of the apparatus and fine positioning of the apparatus.
Figure 3:
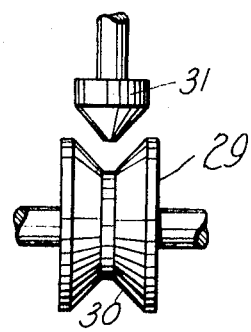

When the table 10 is coarsely positioned, the probes 31 and 38 are extended into the grooves 30 and 37 of the respective sliding contact members 29 and 36. Referring to FIG. 2, the V-shaped probe 31 is shown engaged in the V-shaped groove 30. The sliding contact member 29 follows the X movement of the table 10 and the sliding contact member 36 follows the Y movement of the table 10. When the table 10 has reached the selected coarse position, the probes 31 and 38 are raised within the respective grooves 30 and 37 to a predetermined height. Referring to FIG. 3, the probe 31 is shown raised within the groove 30. During the fine positioning of the table 10, if the table 10 moves in an X direction, more than a distance separating the probe 31 from the side of the groove 30, the probe 31 engages the contact member 39 to make an electrical connection to operate the indicating device 43. The height of the probe 31 with respect to the groove 30, the angle of the cooperating V-shaped probe 31 and groove 30, are selected to give the desired limit of movement. The probe 38 cooperates with groove 37 and the member 36 in an identical manner to indicate Y limits of movement of the table 10.

It is to be understood that the above-described embodiment is simply illustrative of the principles of the invention, and that many other embodiments may be devised without departing from the scope and spirit of the invention.

I claim:

1. An apparatus for sensing a predetermined limit of movement of a workpiece from a selected position wherein the workpiece is first coarsely moved to the selected position and then finely moved to a fine position, comprising:

a sliding member;

means for moving the sliding member in a direct relationship with the workpiece until the workpiece reaches the selected position;

means for deactuating the moving means when the workpiece reaches the selected position; and means for sensing the predetermined limit of movement of the workpiece relative to the sliding member after the moving means has been deactuated.

2. An apparatus for sensing a predetermined limit of movement of a workpiece from a selected position wherein the workpiece is first coarsely moved to the selected position and then finely moved to a fine position, comprising:

a sliding member;

means for engaging the sliding member to move the sliding member along with the workpiece until the workpiece reaches the selected position;

means for disengaging the engaging means when the workpiece reaches the selected position; and means for sensing the predetermined limit of movement of the workpiece relative to the sliding member after the disengaging means has operated.

3. An apparatus for sensing a predetermined length of movement of a workpiece from a selected position, comprisa sliding contact member;

engaging contact means for moving along with the workpiece; said engaging contact means having (1) a first position wherein the engaging contact means is engaged with the sliding contact member to move the sliding contact member along with the workpieces; and (2) a second position wherein the engaging contact means is displaced from the sliding contact member such that the engaging contact means engages the sliding contact member when the workpiece moves the predetermined length of movement relative to the sliding contact member;

means for operating the engaging contact means in the first position while the workpiece is moved to the selected position and for operating the engaging contact means in the second position after the workpiece has reached the selected position; and means operated when the engaging contact means is in the second position for electrically sensing the engagement of engaging contact means with the sliding contact member.

4. An apparatus as defined in claim 3, wherein:

the sliding contact member has a V-shaped groove; and the engaging contact means has a V-shaped member for cooperating with the V-shaped groove; said V-shaped member being engaged in the V-shaped groove when the engaging contact means is in the first position; and said V-shaped member being displaced from the V-shaped groove when the engaging contact means is in the second position such that the V-shaped member engages the side of the V-shaped groove when the workpiece moves the predetermined length of movement relative to the sliding contact member.